United States Patent
Jorgensen et al.

[15] 3,662,180

[45] May 9, 1972

[54] ANGLE CODING NAVIGATION BEACON

[72] Inventors: Stig W. Jorgensen, Hollis; Philip M. Johnson, Windham, both of N.H.

[73] Assignee: Sanders Associates, Inc., Nashua, N.H.

[22] Filed: Nov. 17, 1969

[21] Appl. No.: 877,333

[52] U.S. Cl. ............................. 250/199, 343/102, 343/106, 340/347 P, 340/26, 340/29, 356/152
[51] Int. Cl. ........................................................ H04b 9/00
[58] Field of Search ........... 343/102, 106, 10; 340/26, 347 P, 340/29; 356/152; 250/199

[56] References Cited

UNITED STATES PATENTS

| | | | |
|---|---|---|---|
| 2,979,719 | 4/1961 | Avery et al. | 343/106 |
| 2,609,534 | 9/1952 | Taylor | 343/106 |
| 3,012,224 | 12/1961 | Ferguson | 340/26 |

FOREIGN PATENTS OR APPLICATIONS

| | | | |
|---|---|---|---|
| 290,333 | 5/1928 | Great Britain | 343/106 |

*Primary Examiner*—Benjamin A. Borchelt
*Assistant Examiner*—S. C. Buczinski
*Attorney*—Louis Etlinger

[57] ABSTRACT

An angle coding navigation beacon comprises radiant energy projector in combination with a coded mask whereby an angle dependent code is projected into space. The angular disposition of a remote observer or receiver may be determined relative to the axis of the beacon by the type, number and sequence of energy pulses received during a predetermined time interval. The invention is amenable with a variety of energy sources including optical, acoustic and microwave energy.

25 Claims, 9 Drawing Figures

INVENTOR
PHILIP M. JOHNSON
STIG W. JORGENSEN

BY Robert Van Epps

AGENT

INVENTORS
PHILIP M. JOHNSON
STIG W. JORGENSEN

INVENTOR
PHILIP M. JOHNSON
STIG W. JORGENSEN

ANGLE CODING NAVIGATION BEACON

BACKGROUND OF THE INVENTION

1. Field of the Invention

The present invention relates most generally to the field of navigation aids and in particular to a new and novel navigation beacon for projecting coded angle information to a remote point.

2. Description of the Prior Art

Prior to the present invention in situations where it was essential that an observer, such as an aircraft pilot, be provided with precise information regarding his position relative to a known point, a ground based tracker was used to track a point source of energy mounted on the vehicle. The tracking information was processed on the ground and then transmitted back to the vehicle via an RF or radio data link. In order to provide a position bearing referenced to an aircraft, such as is necessary for the calibration of electronic navigation aids the position information must be collected in the aircraft and the systems of the prior art have not proven adequately accurate to provide the precision calibration required. A number of other problems which have been encountered with the ground based trackers and data link systems include interference from solar background energy, interference from sources mounted on other than the desired vehicle in a high density air traffic environment, undue complexity, and attendant unreliability of the tracking and data link systems and heavy attenuation of the tracking source energy in areas of high air pollution. In the area of near-shore marine navigation a continuing search has been carried on for economical and reliable beacons for providing relative bearing information.

OBJECTS AND SUMMARY OF THE INVENTION

It is therefore a primary object of the present invention to provide a new and novel apparatus whereby coded bearing information is transmitted to a remote receiver or observer.

It is another object of the present invention to provide apparatus of the above-described character which requires no signal processing apparatus at the beacon site.

It is an additional object of the present invention to provide apparatus of the above-described character employing a coded, time varying pattern at the focal plane of a projector.

It is a further object of the present invention to provide apparatus of the above-described character which projects a system of binary coded fan shaped radiation beams.

It is also an object of the present invention to provide apparatus of the above-described character suitable for calibration of navigation systems.

It is still another objective of the present invention to provide apparatus of the above-described character which is substantially immune from the effects of solar background interference.

It is yet an additional object of the present invention to provide apparatus of the above-described character which is fully automatic in operation.

It is still a further object of the present invention to provide apparatus of the above-described character which projects coded bearing information to a remote human observer. These and other objectives of the invention are achieved by providing a radiant energy projector with a rotating coded mask. The back-illuminated mask pattern is disposed in the focal plane of the projector lens which may be used with an energy spreading plate whereby a series of digitally coded fan shaped beams are projected into space. In the preferred embodiment a pulsed radiation source is used. A remote receiver comprises simply a suitable radiation detector, a memory which records the presence or absence of a preselected number of energy pulses for the duration of a sampling period, a decoder and an angular position readout. In the practice of the invention all angular position data is left directly in the remote receiver rather than at the beacon site and the necessity of complex tracking and data transmission systems is completely obviated. Alternatively the angle information is provided to a remote human observer.

The foregoing as well as other objects, features and advantages of the present invention will become more apparent from the following detailed discussion taken in conjunction with the appended drawings.

DESCRIPTION OF PREFERRED EMBODIMENT

Figure 1:
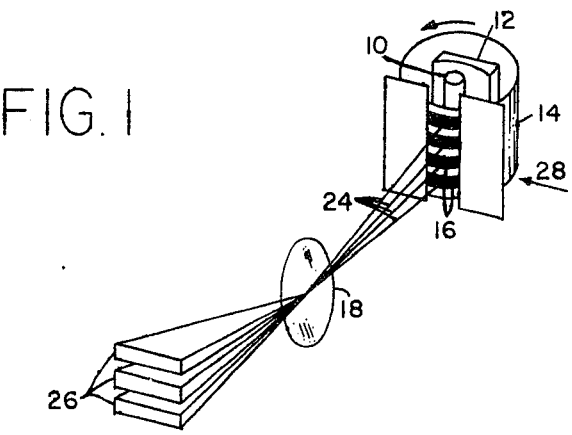
FIG. 1 is a schematic perspective view of one embodiment of the present invention.
Figure 1A:
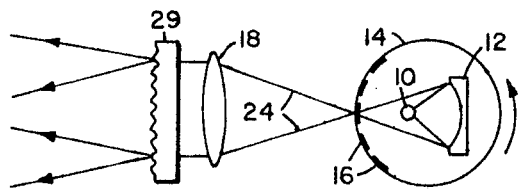
FIG. 1A is a schematic horizontal cross section view of the apparatus of FIG. 1.
Figure 1C:
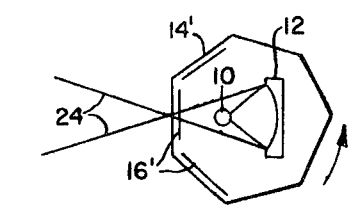
FIG. 1C is a horizontal cross section view of a modification of the apparatus of FIG. 1.
Figure 1B:
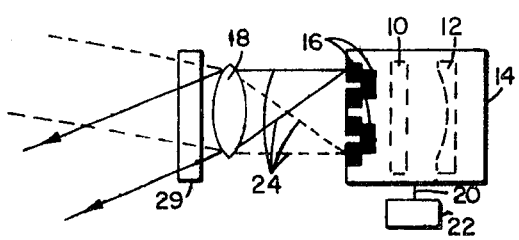
FIG. 1B is a vertical schematic cross section view of the apparatus of FIG. 1.

Turning now to FIG. 1, 1A and 1B, there are shown schematic views of an angle coding beacon fabricated in accordance with the principles of the present invention. For the purposes of illustration the present invention will be described in terms of light radiation which is intended to denote energy in the ultraviolet, visible and infrared regions of the electromagnetic spectrum. The invention is to be understood, however, to be equally operable with other energy ranges such as microwaves as well as acoustic waves. The term microwave is intended to include the millimeter wave region and acoustic waves include audible as well as inaudible acoustic energy. The beacon comprises a light source 10 such as a small xenon flash tube, a condensing mirror 12, a rotating drum 14 having a predetermined code 16 defined on the surface thereof and a projection lens 18. The beacon will operate with either a steady light source or with a flash lamp, however, a flash tube is preferred particularly for long range operation due to the higher peak power available. The condensing mirror 12 operates to collect light from the source 10 over as large a solid angle as possible an to form an image of the source 10 on the code drum 14. The code drum 14 is mounted on a shaft 20 and rotated in the desired direction by a motor 22. Light from the source 10 which is passed by the code drum 14 and represented as light rays 24 are collected by the projection lens 18 and projected in a corresponding series of fan shaped beams 26 focused either at the expected distance to the receiver or at infinity such that the projected pattern will be in focus for all distances from the projector greater than a few hundred feet.

Two additional elements of the beacon of FIG. 1 which are desirable but not essential to its operation include an aperture defining slit 28 parallel to the code direction and an optical beam spreading plate 29 transverse to the code direction. In the illustrated beacon the fan shaped beams 26 are coded as a function of elevation angle, i.e. the code direction is the vertical. Through the use of the slit and spreading plate the fan beams are spread in azimuth and in the process are made of uniform intensity. When used with the preferred flash lamp light source 10 these elements provide a signal-to-noise improvement at the remote receiver since the flash will be uniform at all points in each fan beam at the same time (neglecting propagation delays). Thus the remote receiver may be synchronously gated on only at the time a flash is expected with a corresponding reduction in noise.

Figure 2:
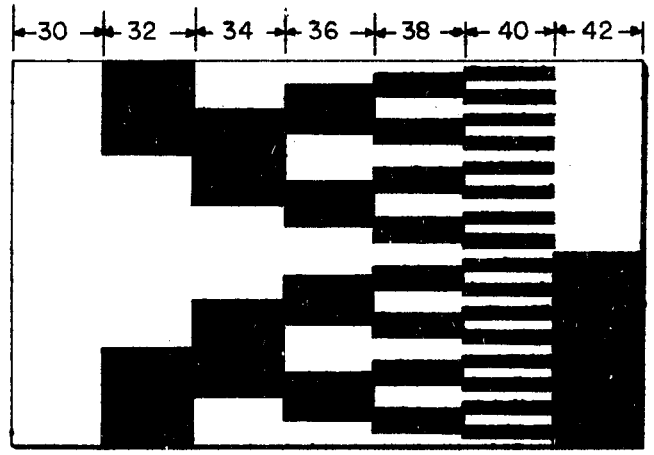
FIG. 2 is a developed view of a binary coded drum suitable for use in the apparatus of FIG. 1.

An example of a binary code pattern which may be used on the rotating drum 14 of FIG. 1 is illustrated in the developed view of FIG. 2. Although any desired cyclic code suitable for a given application may be used in the practice of the present invention a modified gray code is shown, the light transmissive portions of which are shown as white and the opaque portions being shaded. When the projector is focused at infinity, linear distance on the code pattern is converted into angular displacement in space. Thus elevation angle corresponds to the vertical dimension on the code drum and azimuth angle corresponds to the horizontal dimension. However, in the embodiment described which uses the slit 28 and the plate 29, the cylindrical mask and the aperture defining slit 28 cause an image of only a vertical strip, narrow in the horizontal direction, to be transmitted at any one time and this narrow strip is spread horizontally by the plate 29. Accordingly, there is no coding in the horizontal dimension. As the code drum revolves about its vertical axis the code pattern moves at a constant velocity in the horizontal direction. In space the pattern sweeps by a remote receiver in a horizontal direction and in a manner to be more fully described hereinbelow the receiver registers a time sequence of binary light intensity levels. This sequence is unique for each of a preselected number of resolution elements in elevation which in the illustrated example is 64 elements.

When the present invention in its preferred form includes a flash lamp light source and an aperture defining slit the lamp may be fired each time a "bit" of the drum code pattern is approximately centered in the aperture defining slit. To facilitate operation of the apparatus in this manner each bit of the code may be disposed on a flat surface of a polygonal drum. FIG. 1C illustrates such an arrangement in which the cylindrical drum 14 has been replaced by a drum 14' having a polygonal cross section and in which the various bits of the code 16 are disposed on the flat surfaces. The lamp may then be synchronized in any of a number of well known ways to flash when the flat code bit is in the focal plane of the projection lens. In this way the facets on the drum and thus the code pattern bits may be made longer in the non-coded dimension with the entire pattern remaining in focus.

The initial or start-bit 30 appears in the defining slit and the flash lamp is fired. The first significant bit 32 then rotates into the defining slit and the lamp is fired again. At this time the center one-half of the beacon field of view is illuminated while the upper and lower quarters of the field of view are not. The presence of a flash is recorded as a "one" and the absence is recorded as a "zero." As each of the remaining bits 34–42 pass sequentially into alignment with the aperture defining slit the lamp is fired such that preselected portions of the field of view will be illuminated in a predetermined sequence. The last bit 42 in the sequence is the up-down bit which splits the field of view, illuminating only the lower half. It is to be noted that if the resolution of the projection lens is at least as good as one-half the width of the smallest resolution element in the pattern, there will be no ambiguities in the transmitted pattern since the pattern is so arranged that the remote receiver can be on a dividing line between light and dark in no more than one of the bits.

Figure 3:
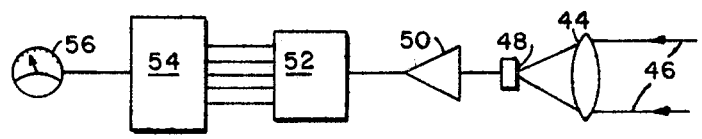
FIG. 3 is a schematic diagram of a remote receiver useful in the practice of the present invention.

A remote receiver which is useful in the practice of the present invention is schematically illustrated in FIG. 3. It is to be understood, however, that the above-described beacon if operated at a sufficiently low speed may provide angular information to an unaided remote observer. The receiver shown in FIG. 3 comprises a simple focusing lens 44 which collects the energy 46 projected by the beacon and focuses it on a spectrally compatible photoelectric detector element 48. The electrical output of the detector 48 is coupled through an amplifier 50 to a memory 52 which records the presence or absence of each of a preselected number of light flashes during the period of 1 revolution of the beacon code drum. The outputs of the memory 52 are coupled to a decoder 54 wherein the binary coded angle information is converted to the angular position of the receiver with respect to the axis of the beacon. The angular position information may then be coupled to any suitable readout device illustrated for simplicity as a meter 56.

Figure 4:
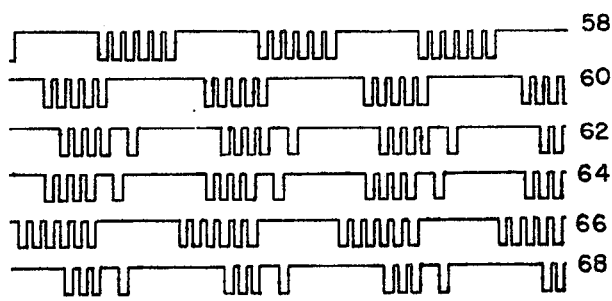
FIG. 4 is a graphic representation of the output of the apparatus of FIG. 3 in response to binary coded energy projected by the apparatus of FIG. 1 using the drum of FIG. 2.

FIG. 4 is a graphic illustration of the output of detector 48 when the receiver of FIG. 3 is disposed at various angular orientations with respect to the beacon of FIG. 1. A beacon fabricated by the applicants in accordance with their invention included a small xenon flash tube as a source and a 6 inch diameter code drum having a total of six bits. The angular resolution element was approximately 1/6° over a 10° field of view. The trace 58 was recorded at the detector output when the receiver was located at a position 1 resolution element of 1/6° below the center of the beacon field of view. Traces 60 through 68 represent successive changes in the position of the receiver of 1/6°. The beacon so fabricated by the applicants was further found to operate equally well when the flash lamp was fired once for each information bit and when operated essentially as a steady source.

It will be understood that the invention as described hereinabove operates to provide precision angle information primarily in one dimension; i.e. either azimuth or elevation, however, the use of two orthogonally oriented beacons operating at two different wavelengths could provide both azimuth and elevation information to a remote two color receiver. Alternatively, azimuth and elevation may be synchronized for time shared operation.

It will further be noted that the present invention also has potential application to the problem of providing precision information as to the orientation of a vehicle. In an instrumented test range environment for example it may be desired to know the precise orientation of an aircraft. The above-described beacon need only be affixed to the aircraft and a receiver located on the ground. The beacon then transmits digitally coded angle information to the ground station which may be decoded to determine the angular orientation i.e. pitch, roll, etc. of the aircraft with respect to the ground.

Figures 5, 6:
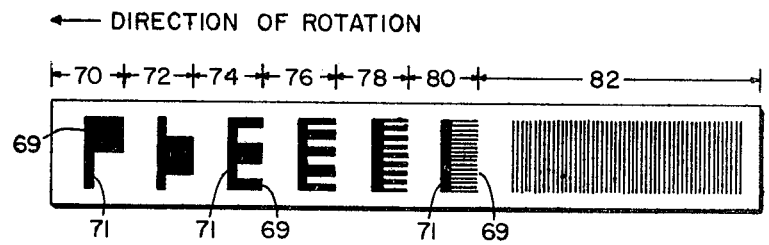
FIG. 5 is a developed view of an alternative coding arrangement of utility in the practice of the present invention.
FIG. 6 is an illustration of a decoding table for use with the code shown in FIG. 5.

FIG. 5 is an illustration of a Morse type code which is particularly useful with the apparatus of FIG. 1 to provide relative angle information to a remote human observer. The code pattern may be a photographic transparency wrapped about the surface of a plexiglass drum in the manner shown in FIG. 1. As the drum rotates an observer at some distance from the beacon will see long and short flashes of light corresponding to the wide 69 and narrow 71 clear areas on the code pattern of each bit. In the illustrated code pattern six information bits 70 through 80 are divided into 64 resolution elements of 1/3°. In addition to the six information bits the code may also include what may be termed a warning bit or signal 82. After bit 80 the remote observer will see a flashing light which persists for a predetermined period of time and which warns him that a new code cycle is about to begin. In practice the applicants have found that a flashing rate of 10 hertz is particularly useful as a warning signal since it is irritating to the human eye and is thus very noticeable. In an embodiment of the invention actually fabricated by the applicants the duration of the short flashes defined by the narrow clear areas 71 of the code were of 0.2 second which is approximately equal to the time constant of the human eye, and the long flashes defined by the broader clear code areas 69 were 0.8 second. There was found to be no confusion between short and long pulses in operation.

While the mask illustrated in FIG. 5 may be used to provide either horizontal or vertical angle information, it is thought at present that it will find wider application in the determination of relative horizontal angle. When this mask is used with the apparatus of FIG. 1 to determine horizontal angles, it is, of course, necessary to orient the apparatus so that the drum axis is horizontal, with the bits 70 to 80 being projected sequentially as the drum turns.

After 1 full revolution of a code drum having the pattern illustrated in FIG. 5 the remote observer will have seen a combination of long and short light flashes which is a unique function of his angular position with respect to the beacon. The observer need then only refer to a decoding table such as that illustrated in part in FIG. 6 to determine his relative bearing.

The unique code will correspond to one particular angular resolution element, the extent of which is a function of the code dimension and the focal length of the optical projection system. Thus when the observer is in the 10 resolution element to the right of the beacon axis a coded signal comprising two long two short, a long and a short flash will be seen. When, on the other hand, the observer is in the 10th resolution element to the left of the beacon axis a short, a long, two short, a long, and a short flash will be observed. It will be apparent that in practical applications the decoding table would be set off directly in degrees rather than in resolution elements as shown in FIG. 6.

The present invention has been described in terms of a light and optical components for the purposes of illustration. It will be apparent, however, that should it be desirable to do so, other wavelength regions may be used equally well in the practice of the present invention. For example, a solid state Gunn effect oscillator may be employed as a source of millimeter waves in combination with a suitable coded mask and either reflective or refractive dielectric optics to project a desired code into space. In an acoustic embodiment the present invention may provide an efficient underwater navigation aid for divers as well as near-shore surface traffic. Regardless of the wavelength of energy used the principles of the invention remain the same.

It will thus be apparent that the applicants have provided a new and novel electro-optical angle coding beacon wherein the angle information is made directly available at the remote receiver and the requirement for complex communications apparatus is completely eliminated. Since certain changes in the above-described construction will occur to those skilled in the art without departing from the scope of the invention, it is intended that all matter contained in the above description or shown in the appended drawings shall be interpreted as illustrative and not in a limiting sense.

Having described what is new and novel and desired to secure by Letters Patent, what is claimed is:

1. An angle coding navigation beacon comprising
    a radiant energy source,
    a radiation projection means,
    a hollow drum having transparent and opaque portions arranged in a preselected code of angular resolution elements in the code direction along the longitudinal axis of said drum and information bits in the transverse direction about the circumference of said drum each said resolution element having a unique sequence of information bits,
    means for rotating said drum at a preselected rate about the longitudinal axis thereof such that said information bits are sequentially brought into the focal plane of said projection means and energy from said source passed by the transparent portions thereof is projected into space in a plurality of fan shaped beams each said beam corresponding to an angular resolution element of said beacon, and
    each said angular resolution element being illuminated in space with a predetermined cyclic series of energy flashes which is unique to that resolution element.

2. Apparatus as recited in claim 1 wherein
    said code is a digital binary code in which each said information bit is of substantially the same duration and each said resolution element is encoded on said drum with a unique sequence of transparent and opaque portions.

3. Apparatus as recited in claim 1 wherein
    said code is an arrangement of relatively long and short transparent portions in which each said resolution element is illuminated in space by a unique sequence of long and short energy flashes.

4. Apparatus as recited in claim 1 wherein
    said radiant energy is light, and
    said projection means is an optical projector.

5. Apparatus as recited in claim 4 wherein
    said light source comprises a linear flash lamp and a condensing mirror disposed with respect to said lamp such as to form an image thereof on said drum.

6. Apparatus as recited in claim 4 wherein
    said information bits are projected for a duration not less than the time constant of the human eye.

7. Apparatus as recited in claim 1 wherein
    said radiant energy is acoustic energy.

8. Apparatus as recited in claim 1 wherein
    said radiant energy is microwave energy.

9. Apparatus as recited in claim 3 wherein
    one said information bit at the end of each cyclic series comprises a plurality of alternating opaque and transparent segments common to all resolution elements of said code.

10. Apparatus as recited in claim 1 wherein
    said energy source is adapted for intermittent operation synchronously with the revolution of each information bit into the focal plane of said projection means.

11. Apparatus as recited in claim 4 wherein
    said code comprises a photographic transparency affixed to the surface of an optically transparent drum substrate.

12. Apparatus as recited in claim 1 further including
    means for defining an aperture slit parallel to said code direction substantially at the focal point of said projection means.

13. Apparatus as recited in claim 10 wherein
    said drum is polygonal and each facet thereof includes a single information bit in each resolution element.

14. Apparatus as recited in claim 12 further including
    means disposed adjacent said projecting means opposite said drum for spreading said beam in a direction transverse to said code direction 15. A system for determining the relative angle of a source of radiant energy comprising
    an angle coding navigation beacon including
    a radiant energy source,
    a radiation projection means,
    a hollow drum having transparent and opaque portions arranged in a preselected binary code of angular resolution elements along the longitudinal axis of said drum and information bits in the transverse direction about the circumference of said drum each said resolution element having a unique sequence of information bits,
    means for rotating said drum about the longitudinal axis thereof such that said information bits are sequentially brought into the focal plane of said projection means and energy from said source passed by the transparent portions thereof is projected into space in a plurality of fan shaped beams each beam corresponding to an angular resolution element of said beacon, and
    each said angular resolution element being illuminated in space with a predetermined cyclic series of energy flashes which is unique to that resolution element,
    means disposed at a remote position for receiving said projected energy flashes, and
    means for decoding the sequence of said received energy flashes to thereby determine the particular angular resolution element in which said receiving means is disposed thereby establishing the angular position thereof with respect to said beacon.

16. Apparatus as recited in claim 15 wherein
    said energy source is adapted for intermittent operation synchronously with the revolution of each said information bit into the focal plane of said projection means, and
    said receiving means includes means for synchronously activating said receiving means only during periods in which a flash of energy is projected by said beacon.

17. Apparatus as recited in claim 15 wherein
    said radiant energy is light.

18. Apparatus as recited in claim 17 wherein
    said light source comprises a linear flash lamp and a condensing mirror disposed with respect to said lamp such as to form an image thereof on said drum.

19. Apparatus as recited in claim 15 wherein
    said radiant energy is acoustic energy.

20. Apparatus as recited in claim 15 wherein
    said radiant energy is microwave energy.

21. Apparatus as recited in claim 16 wherein
said drum is polygonal and each facet thereof includes a single information bit in each said resolution element.

22. Apparatus as recited in claim 15 wherein
the resolution of said projection means is at least as small as one-half the width of the smallest of said resolution elements of said code.

23. A beacon for providing an observer at a remote location with an indication of the angular deviation of his line of sight to the beacon from a reference direction through the beacon, comprising,
means for sequentially projecting into substantially the same space a plurality of different patterns of energy,
each pattern comprising areas where energy is present and absent alternately in that dimension in which angular deviation is to be determined,
all of said patterns together constituting a positional code, of which said areas are constituents, by which the sequence of successive periods of the presence and absence of energy observed at any point determines the aforesaid deviation.

24. A beacon in accordance with claim 23 in which said means for projecting includes
a light source,
projection optics,
a mask bearing representations of all of said patterns, and
means for bringing said representations successively into the focal plane of said projection optics.

25. A beacon in accordance with claim 24 which includes means for energizing said light source each time one of said representations is substantially centered in said focal plane.

* * * * *